United States Patent
Szczygiel et al.

(10) Patent No.: US 9,446,694 B2
(45) Date of Patent: Sep. 20, 2016

(54) EXTENDABLE COMFORT HEADREST

(71) Applicant: AISIN TECHNICAL CENTER OF AMERICA, INC., Northville, MI (US)

(72) Inventors: Lindsey Szczygiel, Pinckney, MI (US); Ryosuke Mizuno, Novi, MI (US); Mike Howlett, Troy, MI (US); Bradley Baskin, Ann Arbor, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 0 days.

(21) Appl. No.: 14/566,079

(22) Filed: Dec. 10, 2014

(65) Prior Publication Data
US 2015/0329025 A1    Nov. 19, 2015

Related U.S. Application Data

(63) Continuation-in-part of application No. 14/302,148, filed on Jun. 11, 2014, which is a continuation-in-part of application No. 29/491,099, filed on May 16, 2014, now Pat. No. Des. 725,952.

(51) Int. Cl.
*B60N 2/48* (2006.01)

(52) U.S. Cl.
CPC ..... *B60N 2/4882* (2013.01); *B60N 2002/4888* (2013.01)

(58) Field of Classification Search
CPC .................................................. B60N 2/4882
USPC ................................................. 297/391, 410
See application file for complete search history.

(56) References Cited

U.S. PATENT DOCUMENTS

| | | | | |
|---|---|---|---|---|
| 3,572,834 A | * | 3/1971 | Herzer | B60N 2/4817 297/397 |
| 4,205,878 A | * | 6/1980 | Wooten | B60N 2/449 297/391 |
| 5,669,668 A | * | 9/1997 | Leuchtmann | 297/408 |
| 5,918,914 A | * | 7/1999 | Morris | F16L 17/02 285/351 |
| 5,997,091 A | * | 12/1999 | Rech et al. | 297/391 |
| 6,120,099 A | * | 9/2000 | Reikerås et al. | 297/391 |
| 6,220,668 B1 | * | 4/2001 | Scheffzuck | 297/391 |
| 6,354,664 B1 | * | 3/2002 | Chen | A47C 7/402 297/353 |
| 6,601,804 B2 | * | 8/2003 | Bisch | 248/118 |
| 6,682,143 B2 | * | 1/2004 | Amirault et al. | 297/250.1 |
| 7,131,698 B2 | * | 11/2006 | Dowty et al. | 297/408 |
| 7,144,083 B2 | * | 12/2006 | List et al. | 297/391 |
| 7,631,935 B2 | * | 12/2009 | Chen et al. | 297/284.9 |

(Continued)

FOREIGN PATENT DOCUMENTS

| DE | 196 53 516 A1 | 6/1997 |
|---|---|---|
| DE | 200 16 359 U1 | 12/2001 |

(Continued)

OTHER PUBLICATIONS

Extended European Search Report mailed May 6, 2016.

*Primary Examiner* — Timothy J Brindley
(74) *Attorney, Agent, or Firm* — Oblon, McClelland, Maier & Neustadt, L.L.P.

(57) ABSTRACT

A vehicle headrest, including a center portion, two side members that attach to opposite ends of the center portion and that extend forward and retract backward and a locking mechanism in each side member that locks each side member independent of the other side member in multiple positions relative to the center portion.

14 Claims, 9 Drawing Sheets

(56) References Cited

U.S. PATENT DOCUMENTS

| | | |
|---|---|---|
| 7,717,517 B2 | 5/2010 | Yamane et al. |
| 8,911,019 B2* | 12/2014 | Josten et al. ............. 297/405 |
| 8,985,622 B1* | 3/2015 | Cannon ..................... 280/730.2 |
| 2004/0217639 A1* | 11/2004 | Clough ...................... 297/391 |
| 2007/0108827 A1* | 5/2007 | Clough ...................... 297/391 |
| 2012/0256451 A1* | 10/2012 | Sahashi ................... 297/180.14 |
| 2012/0299356 A1* | 11/2012 | Edwards ................... 297/397 |
| 2014/0300168 A1* | 10/2014 | Szczygiel et al. ........... 297/391 |
| 2014/0312672 A1* | 10/2014 | Scolari ..................... 297/391 |
| 2014/0375100 A1* | 12/2014 | Reese ....................... 297/391 |
| 2015/0097407 A1* | 4/2015 | Duckert ..................... 297/391 |

FOREIGN PATENT DOCUMENTS

| | | |
|---|---|---|
| JP | 2006069287 A | 3/2006 |
| WO | WO 2010/010748 A1 | 1/2010 |

\* cited by examiner

EXTENDABLE COMFORT HEADREST

CROSS-REFERENCE TO RELATED APPLICATIONS

The present application is a continuation-in-part of application of and claims priority to U.S. patent application Ser. No. 14/302,148 filed on Jun. 11, 2014. U.S. patent application Ser. No. 14/302,148 is a continuation-in-part application of U.S. design application 29/491,099, filed on May 16, 2014. The entirety of both U.S. patent application Ser. No. 14/302,148 and U.S. design application 29/491,099 are incorporated herein by reference.

BACKGROUND

1. Field of the Invention

Exemplary aspects of the present disclosure relate to a headrest of a vehicle to increase the comfort of a user during prolonged use.

2. Description of the Related Art

Seats of a vehicle such as an automobile are provided with a headrest for the safety and comfort of an occupant (user). The headrest provides protection to the occupant in the event of a crash by helping to prevent head, neck, or spinal injuries by limiting the rearward movement of the occupant's head. A headrest also provides comfort to a user by providing a place to rest one's head especially for a long drive.

Headrests may be provided in special arrangements to enhance the comfort of the user. For example, certain materials such as foam may be used to provide a soft cushion. Also, the shape of the headrest may be designed to enhance comfort. See, for example, U.S. Pat. No. 7,717,517 B2. However, U.S. Pat. No. 7,717,517 B2 has a drawback in that the side wings do not go all the way back, which does not give the appearance of a normal headrest when the side wings are not in use.

SUMMARY

The present disclosure is designed to address issues in the related art. In particular, a headrest according to an exemplary embodiment of the present disclosure provides passengers with the convenience of a pillow like cushion that can be adjusted to provide support for the back and the side of the head of the passenger. This additional support provides extra comfort to passengers during long drives.

The vehicle headrest includes a center portion, two side members that attach to opposite ends of the center portion and extends forward and retracts backward and a locking mechanism in each side member locks each side member independent of the other side member in multiple positions relative to the center portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
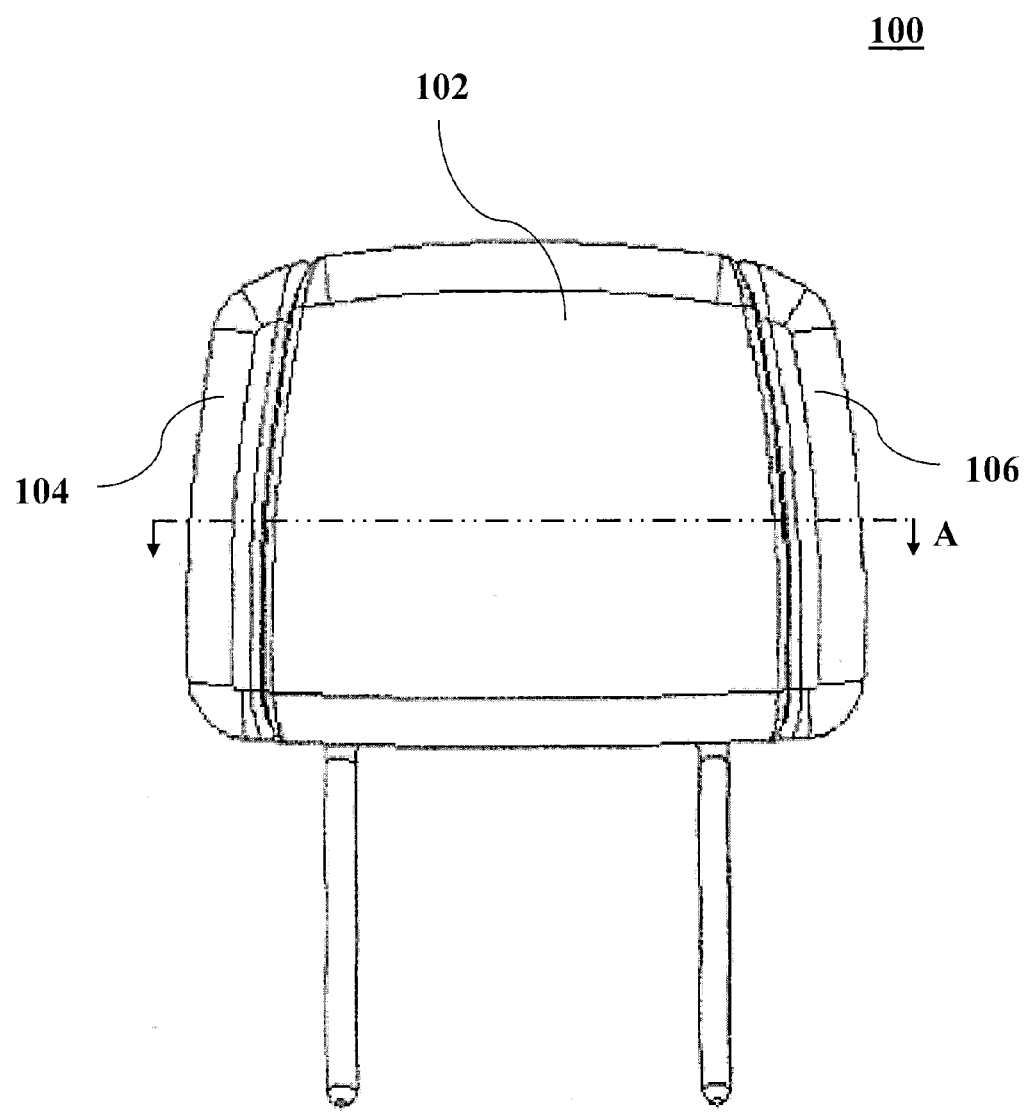
FIG. 1 illustrates a front view of an extendable comfort headrest assembly in accordance with one example.

Referring now to the drawings, wherein like reference numerals designate identical or corresponding parts throughout the several views. Further, as used herein, the words "a," "an" and the like generally carry a meaning of "one or more," unless stated otherwise.

FIGS. 1-9 depict various aspects of an extendable comfort headrest for a vehicle seat. Here a vehicle refers to a land vehicle exemplified by an automobile. However, the present disclosure is also applicable to any similar type vehicle, such as but not limited to, a sport utility vehicle, a pickup truck, a commercial vehicle, airplane, train, or the like.

FIG. 1 illustrates a front view of an extendable comfort headrest 100 according to one embodiment in its retracted position. The extendable comfort headrest 100 includes a center portion 102, and two side members 104 and 106. In the retracted position, the two side members, 104 and 106, are flush with the center portion 102. The side members can be manipulated by a user to extend the side members 104 and 106 out past the front surface of the center portion 102.

Figure 2:
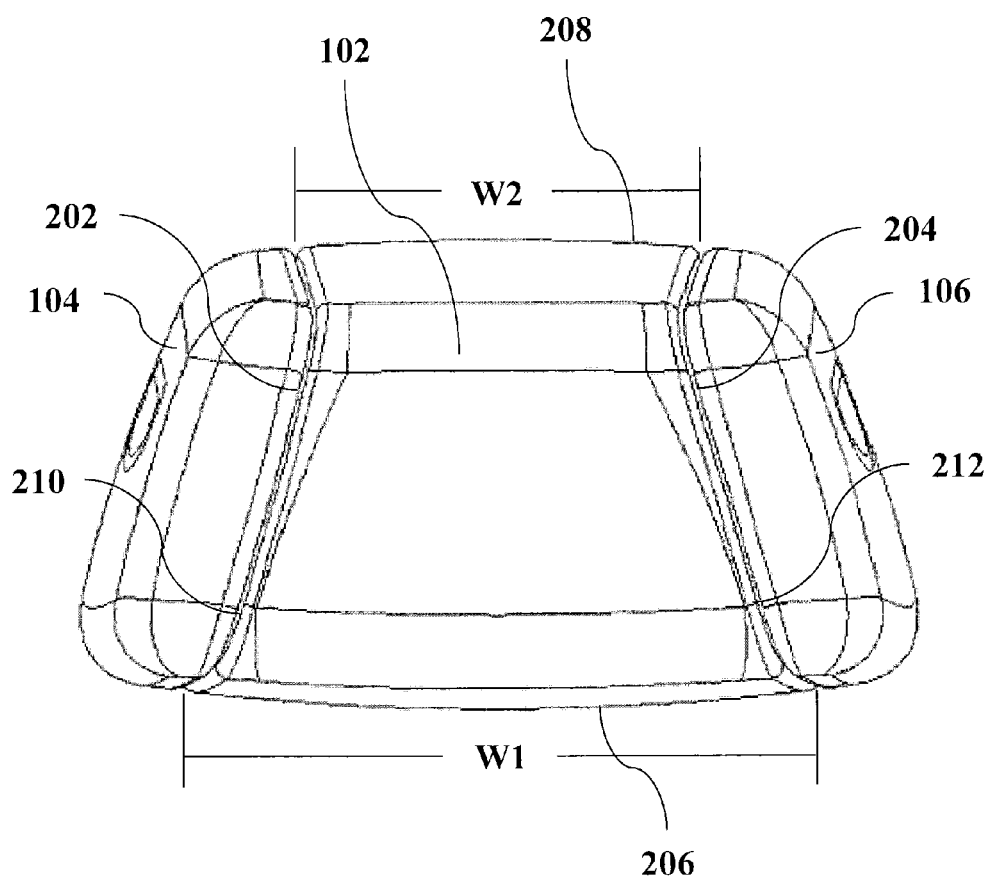
FIG. 2 illustrates a top view of an extendable comfort headrest assembly in accordance with one example.

FIG. 2 illustrates a top view of the extendable comfort headrest 100 in the retracted position according to one embodiment. The sides 202 and 204 of the center portion 102 are angled from the front 206 of the center portion 102 to the back 208 of the center portion. The corresponding interior sides 210 and 212 of the two side member 104 and 106 are angled at the same angle as the sides 202 and 204. Therefore, the width W1 of the front 206 of the center portion 102 is wider than the width W2 of the back 208 of the center portion 102. The angled sides 202 and 204 of the center portion 102 provide angled positions for the side members 104 and 106 when extended. The angle of the angled sides of the center portion 102 is fixed. The current angle shown in the figures merely demonstrates a possible embodiment and not meant to be exclusive. The angle of the angled sides of the center portion 102 could be any possible angle.

Figure 3:
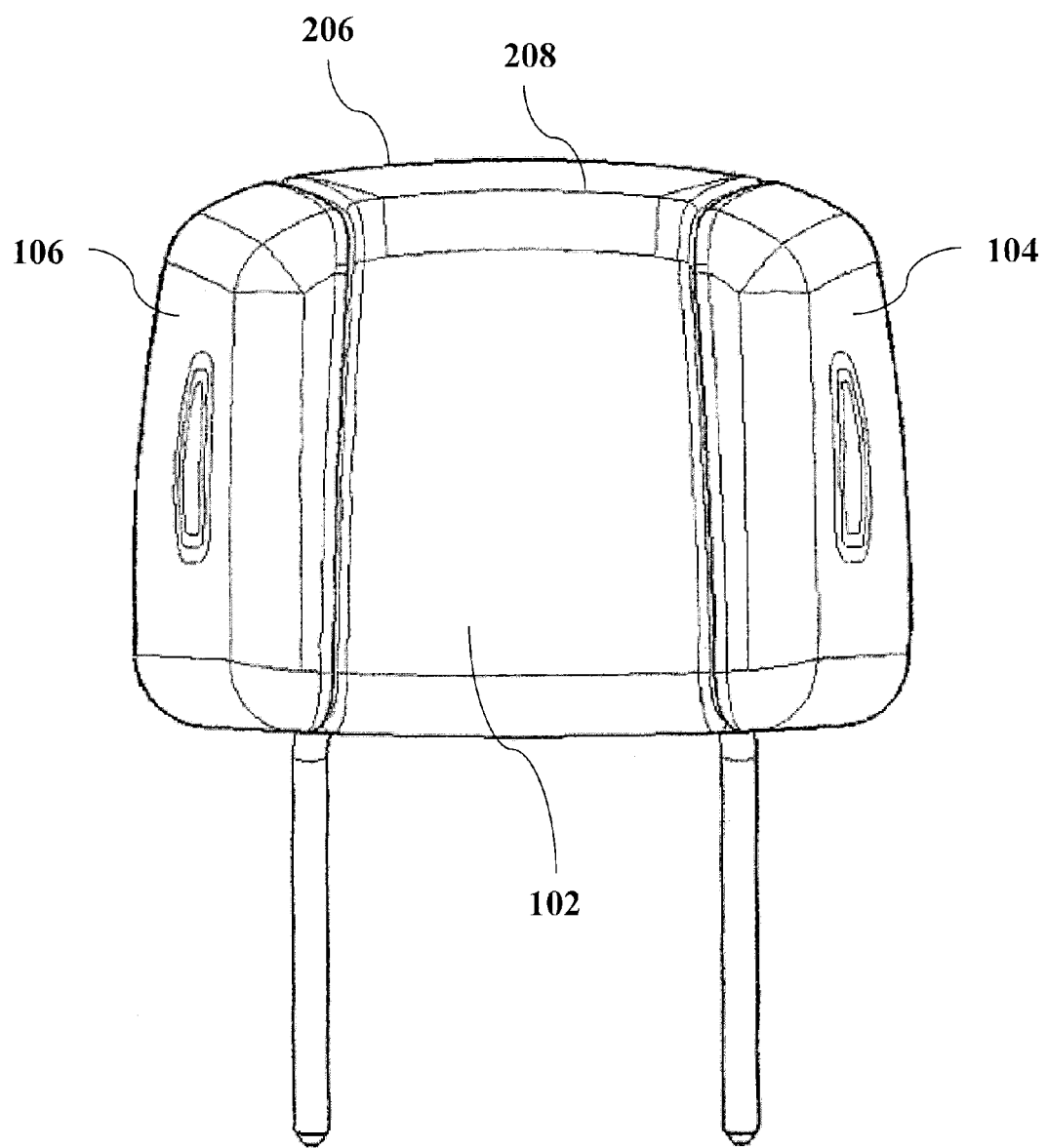
FIG. 3 illustrates a back view of an extendable comfort headrest assembly in accordance with one example.

FIG. 3 illustrates a back view of the extendable comfort headrest 100 in the retracted position according to one embodiment. The center portion 102 has a smaller width in the back 208 of the headrest than in the front 206 of the headrest.

Figure 4:
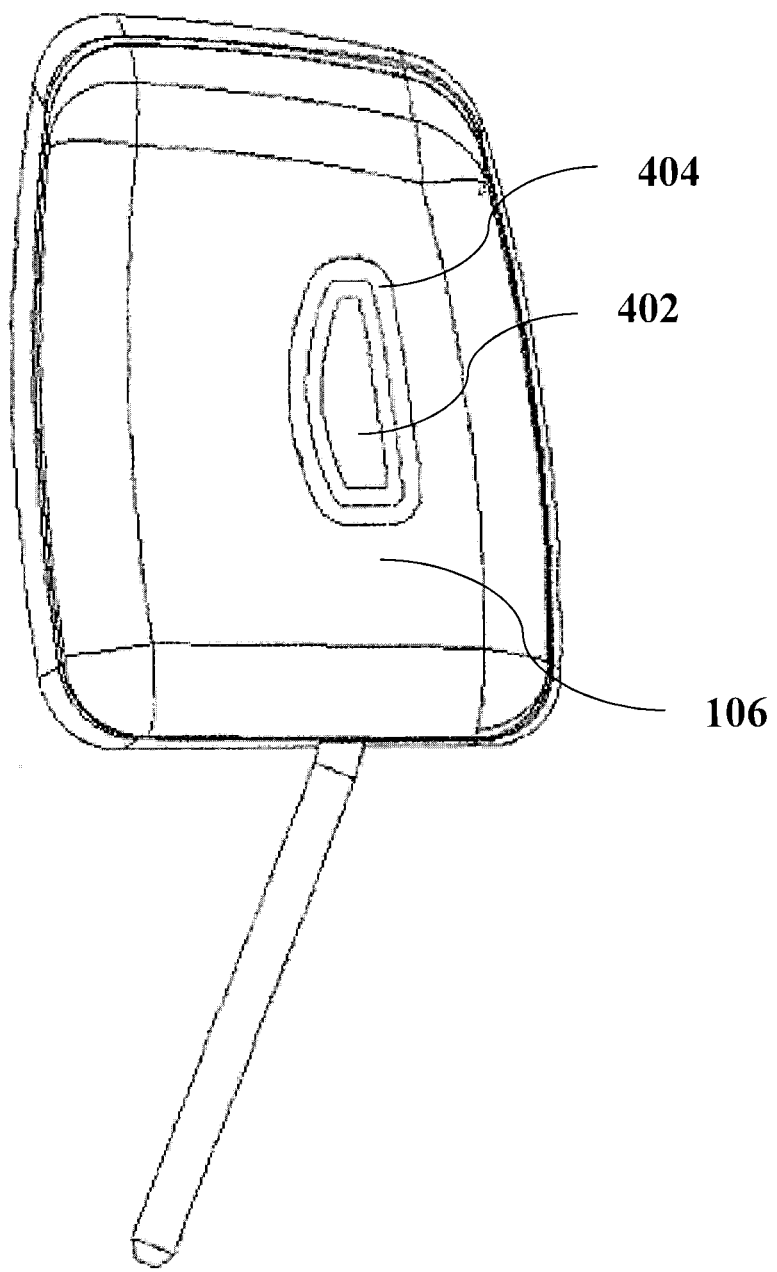
FIG. 4 illustrates a side view of an extendable comfort headrest assembly in accordance with one example.

FIG. 4 illustrates a right side view of the extendable comfort headrest 100 in the retracted position according to one embodiment with side member 106 visible. In the center of the side member 106, a button 402 is illustrated. The button 402 is surrounded by trim 404. The trim 404 adds stability to the button 402. A corresponding button and trim are found on side member 104 of the left side of the extendable comfort headrest 100. The button 402, as discussed below, activates the locking mechanism, and allows the user to manipulate the position of the side member 106 by extending the side member 106 forward, or retracting the side member 106 backwards.

Figure 5:
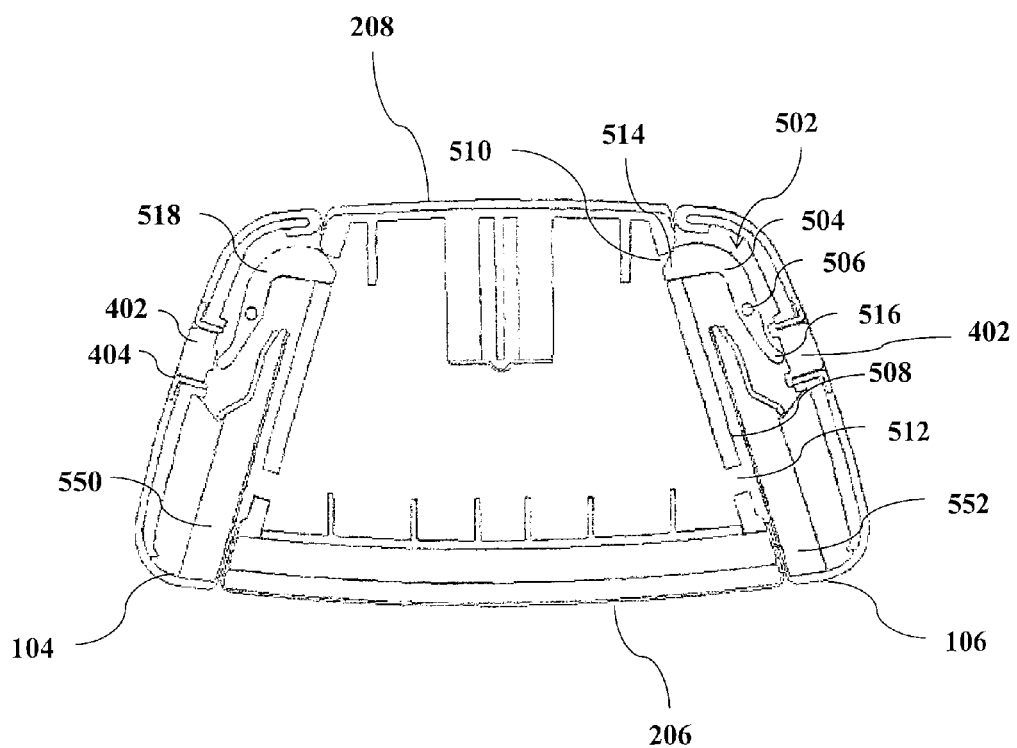
FIG. 5 illustrates a top section view of an extendable comfort headrest assembly in accordance with one example.

FIG. 5 illustrates a top cross-sectional view of the interior structure of the extendable comfort headrest 100 according to one embodiment. The view is based on the cross-section line A in FIG. 1. The front 206 of the extendable comfort headrest 100 is at the bottom of the FIG. 5, and the back 208 is at the top of FIG. 5. A locking mechanism 502 is disposed within each side member 104 and 106. The locking mechanism 502 includes a pin 504 that rotates about a pivot point 506, an inner sliding wall 508, a retracted locking position 510, and an extended locking position 512. The locking positions are slots in the inner sliding wall 508.

As the locking mechanisms 502 for each side member 104 and 106 are substantially the same, the locking mechanism 502 in side member 106 will be explained. A bias force acts on the pin 504 to force the pin 504 toward the inner sliding wall 508. The bias force locks a first end 514 of the pin 504 locked in a slot, such as the retracted locking position 510 shown in FIG. 5. When the user pushes on the button 402, the button 402 depresses and exacts a force on a second end 516 of the locking mechanism pin 504, which causes the pin 504 to rotate about the pivot point 506 in a clockwise direction as shown in the figures, although the pin 504 does not need to rotate clockwise. The force exacted by the button 402 on the pin 504 counteracts the bias force. Correspondingly, the pin 518 in the side member 104 rotates counterclockwise when the button 402 is depressed.

As the pin 504 rotates, the first end 514 of the pin 504 is released from the retracted locking position 510. Once the first end 514 of the pin 504 is released from the retracted locking position 510, the user is able to slide the side member 106 forward. As soon as the first end 514 of the pin 504 engages with the inner sliding wall 508 outside the slot, the user no longer needs to press the button 402 and exact a force on the second end 516 of the pin 504. Here, the bias force presses the first end 514 of the pin 504 against the inner sliding wall 508 and the first end 514 is configured to slide along the inner sliding wall 508. The first end 514 of the pin 504 continues to slide along the inner sliding wall 508 until the first end 514 encounters a new locking position or slot, such as the extended locking position 512. When the first end 514 encounters a new locking position or slot, the bias force pushes the first end 514 into the slot and locks the pin 504 into the new locking position.

FIG. 5 merely illustrates two locking positions, but the present disclosure is not so limited. The extended comfort headrest could have multiple locking positions to enable the user to adjust the length of the side members 104 and 106 according to the user's preferences or needs. The present disclosure is also not limited by the type of locking mechanism used as long as the locking mechanism 502 allows the user to lock the side members 104 and 106 in more than one location relative to the center portion 102.

FIG. 5 further illustrates that the side member 104 includes a foam 550 located on a side adjacent to the center portion 102. Side member 106 similarly includes foam 552 located on a side adjacent to the center portion 102. The foam 550 and 552 have properties of both sound absorption (deadening) and physical cushioning. The foam and 550 and 552 help create both a quiet and comfortable environment when the side members 102 and 104 are extended. The foam 550 and 552 are preferably a melamine foam but other foams such as polyurethane foam or a vinyl foam composite may also be used.

The present disclosure allows for easy operation by the user because the user can simply push a button and extend the side member forward until it locks into position.

Figure 6:
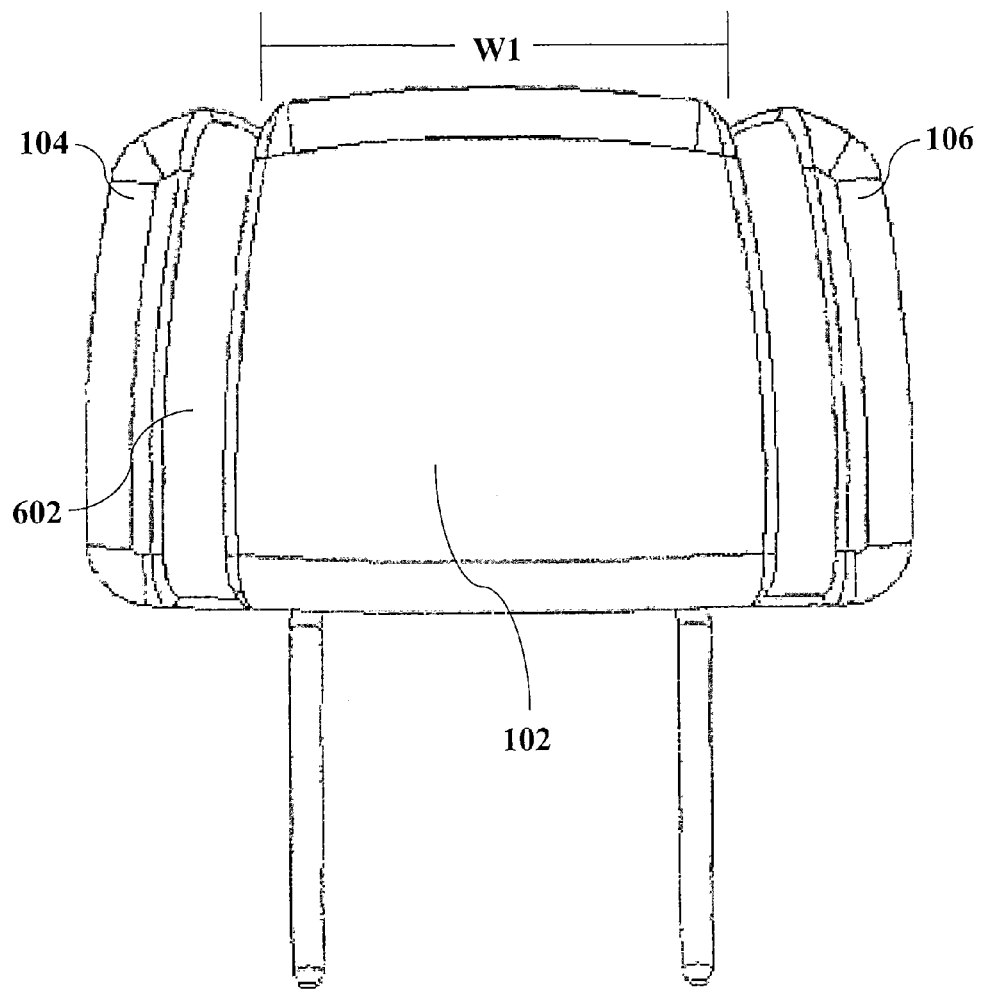
FIG. 6 illustrates a front view of an extendable comfort headrest assembly with side member extended in accordance with one example.

FIG. 6 illustrates a front view of the extended comfort headrest 100 with side member 104 and 106 in the extended position according to one embodiment. Side member 104 and 106 are extended out past the front surface of the center portion 102. With the side member 104 and 106 fully extended, the width W1 of the center portion 102 is sufficient to accommodate the $95^{th}$ percentile male head size. However, the present disclosure is not so limited, and the width could be larger or smaller than W1 to accommodate larger or smaller head sizes.

The extension or retraction of one side member is not dependent on the other side member. The user can extend either one or both of the side members, depending on personal preference or need. The inner surface 602 of the side members 104 and 106 are only exposed when the side members are extended. The inner surface 602 contains padding to ensure the user will be comfortable. The padding could be the foam 550 and 552 or any other material known to one skilled in the art. Further, multiple layers of foam and padding could be used to ensure the comfort of the user.

Figure 7:
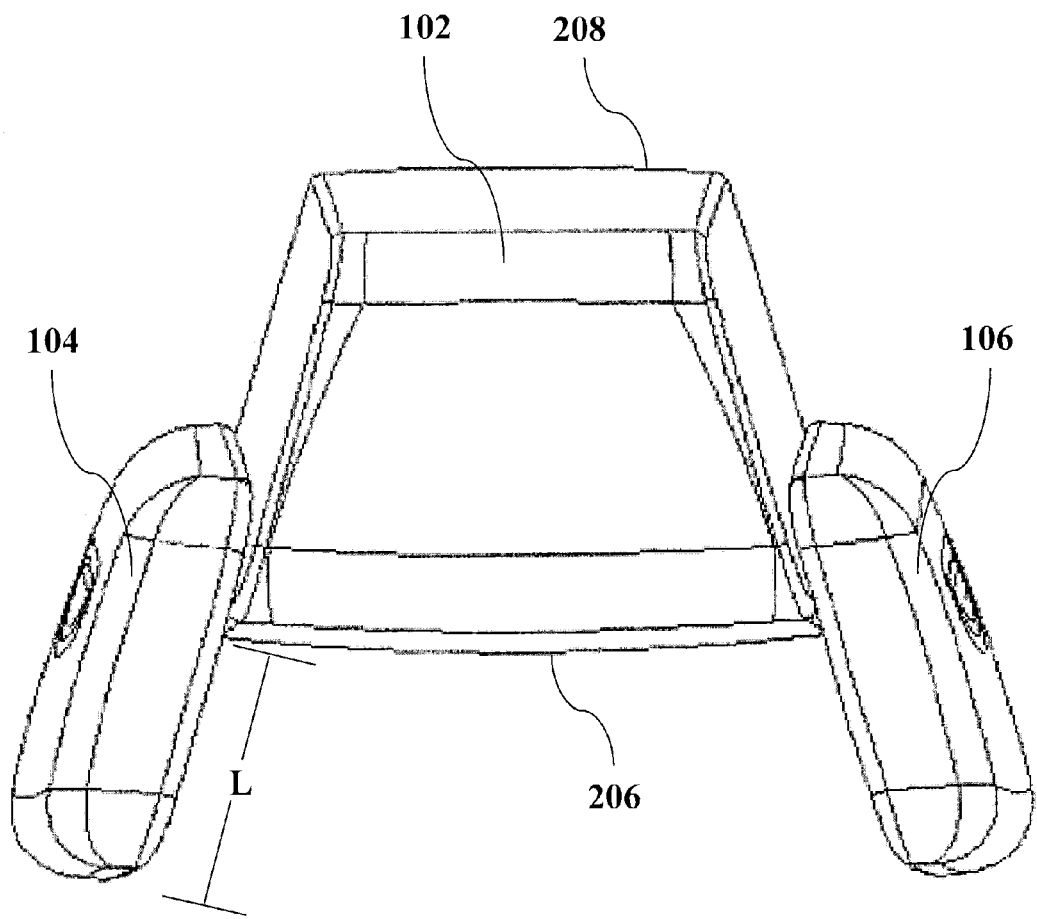
FIG. 7 illustrates a top view of an extendable comfort headrest assembly with side member extended in accordance with one example.

FIG. 7 illustrates a top view of the extendable comfort headrest 100 with the side member 104 and 106 in the extended position according to one embodiment. The front 206 of the extendable comfort headrest 100 is at the bottom of the FIG. 7, and the back 208 is at the top of FIG. 7. The extended position length L is sufficient accommodate the $95^{th}$ percentile male head size. However, the present disclosure is not so limited, and the length could be larger or smaller than L to accommodate larger or smaller head sizes.

Figure 8:
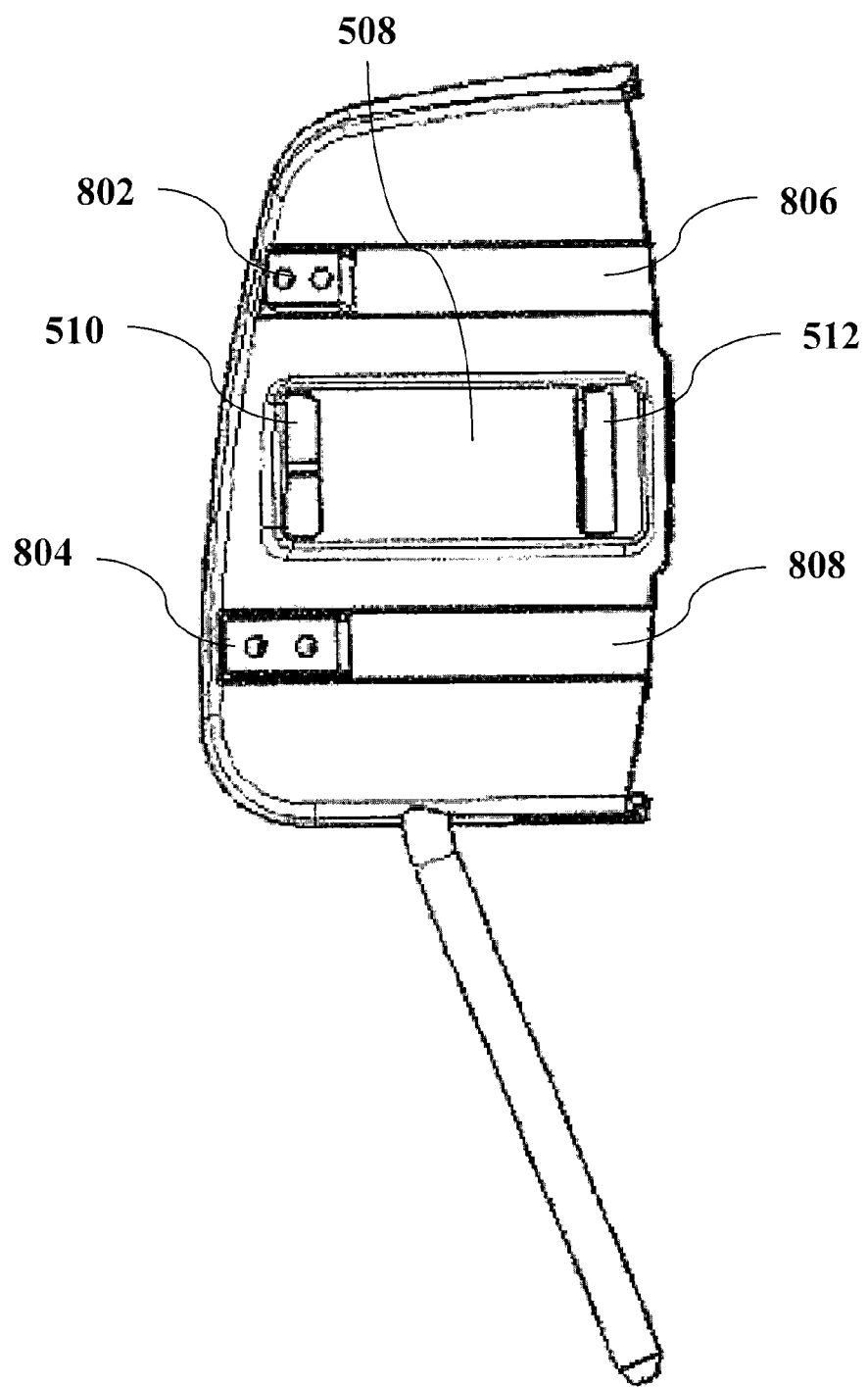
FIG. 8 illustrates a side view of the center portion of the extendable comfort headrest assembly with the side member removed in accordance with one example.

FIG. 8 illustrates a side view of the center portion 102 of the extendable comfort headrest 100 with the side member removed according to one embodiment. Slides 802 and 804 are attached to the side member 104. The slides 802 and 804 control the linear movement of the side members 104 and 106 relative to the central portion 102 by moving through the channels 806 and 808, respectively. When the user unlocks the pin 504, the user is able to slide the side member 104 between the retracted locking position 510 and the extended locking position 512. Although, there could be multiple locking positions or slots, not just two. The first end 514 of the pin 504 also slides along the inner sliding wall 508, as the user slides the side member 104 with the help of the slides 802 and 804 in the slide channels 806 and 808.

As discussed earlier, when the extendable comfort headrest 100 is in the retracted position, the pin 504 is locked in the retracted locking position 510. Further, when the extendable comfort headrest 100 is extended forward, the pin 504 is locked in the extended locking position 512.

The embodiment shown in FIG. 8 illustrates two slides and two sliding channels, but the present disclosure is not so limited. Additional channels and slides could be added to control the linear movement of the side members. The slide mechanism used could be any known slide mechanism to one skilled in the art.

Figure 9:
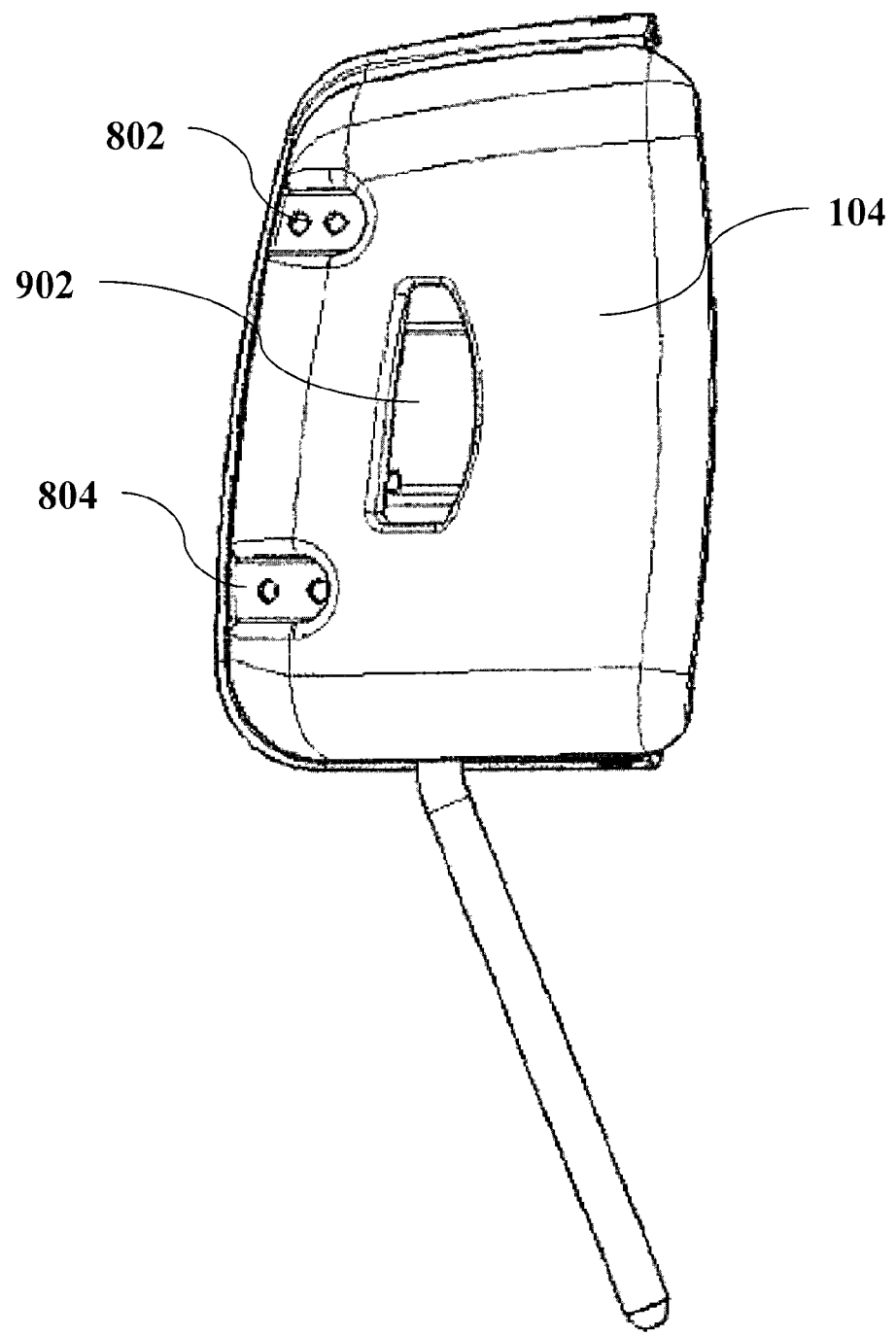
FIG. 9 illustrates a side view of a side member of the extendable comfort headrest assembly in accordance with one example.

FIG. 9 illustrates a side view of the inner structure of the side member 104 of the extendable comfort headrest 100 according to one embodiment. Slides 802 and 804 can be seen through a cut away view. The slides 802 and 804 are attached to the side members 104, and engage with the channels 806 and 808 of the center portion 106. The area 902 houses the button 402.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle headrest, comprising:
a center portion;
two side members that attach to opposite ends of the center portion and that extend forward and retract backward with a linear movement; and
a locking mechanism in each side member that locks each side member independent of the other side member in multiple positions relative to the center portion,
wherein the side members respectively include a foam portion adjacent to the center portion,
wherein the side members includes a button,
wherein outer surfaces of the center portion that respectively face the two side members each include a plurality of locking slots and,
wherein the locking mechanism includes a pin that rotates about a pivot point based on an input from the button, the pin including a first end in contact with the button and a second end that engages one of the plurality of locking slots to lock the respective side member in one of the multiple positions,
wherein the pivot point is between the first end and the second end.

2. The vehicle headrest of claim 1, wherein the locking mechanism has a retracted locking position or an extended locking position.

3. The vehicle headrest of claim 1, wherein the button releases the locking mechanism from a locked position and enables the side member to extend forward or retract backward.

4. The vehicle headrest of claim 1, wherein when the pin rotates about the pivot point, the pin is released from a locked position and enables the side member to extend forward or retract backward.

5. The vehicle headrest of claim 1, wherein the two side members extend at a fixed angle.

6. The vehicle headrest of claim 1, wherein when the side members are retracted, they are flush with the center portion.

7. The vehicle headrest of claim 1, wherein the multiple positions includes an extended position in which the side members are extended forward, and
wherein the side members each include an interior surface adjacent to the center portion, the respective interior surfaces being exposed in the extended position.

8. The vehicle headrest of claim 7, wherein the interior surfaces of the side members respectively include the foam portions.

9. The vehicle headrest of claim 1, wherein the foam portions include a melamine foam or a polyurethane foam.

10. The vehicle headrest of claim 1, wherein the center portion includes a channel on respective surfaces of the center portion that are adjacent to the side portions, and
wherein the side members each include a slide that move within the respective channel to control the linear movement of the side members.

11. The vehicle headrest of claim 1, wherein the a button is on the exterior side of the side members, and
wherein depressing the button causes the pin to rotate away from the plurality of locking slots.

12. The vehicle headrest of claim 1, wherein the pin is substantially L-shaped.

13. The vehicle headrest of claim 1, wherein the second end of the pin penetrates the one of the plurality of locking slots to lock the respective side member in the position.

14. The vehicle headrest of claim 1, wherein the side members each include an interior surface that faces the respective outer surfaces of the center portion, and
wherein the second end of the pin extends beyond the respective interior surface to engage one of the plurality of locking slots when in a locked position.

* * * * *